United States Patent
Tsuchiya

(10) Patent No.: US 7,051,076 B2
(45) Date of Patent: May 23, 2006

(54) AUTOMATICALLY CREATING MAILING ADDRESS DIRECTORY IN AN IMAGE COMMUNICATION APPARATUS

(75) Inventor: Hiroteru Tsuchiya, Numazu (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 811 days.

(21) Appl. No.: 10/051,540

(22) Filed: Jan. 16, 2002

(65) Prior Publication Data

US 2003/0135564 A1     Jul. 17, 2003

(51) Int. Cl.
  *G06F 15/16*     (2006.01)

(52) U.S. Cl. .................... 709/206; 707/201; 258/1.15; 258/402

(58) Field of Classification Search ................ 709/207, 709/206, 217, 219; 358/1.15
See application file for complete search history.

(56) References Cited

U.S. PATENT DOCUMENTS

| | | | | |
|---|---|---|---|---|
| 5,966,714 A | * | 10/1999 | Huang et al. | 707/201 |
| 5,987,508 A | * | 11/1999 | Agraharam et al. | 709/217 |
| 6,411,393 B1 | * | 6/2002 | Wakasugi | 358/1.15 |
| 6,480,885 B1 | * | 11/2002 | Olivier | 709/207 |
| 6,742,024 B1 | * | 5/2004 | Ono | 709/219 |
| 2001/0040693 A1 | * | 11/2001 | Saito et al. | 358/1.15 |
| 2002/0138581 A1 | * | 9/2002 | MacIntosh et al. | 709/206 |
| 2004/0252336 A1 | * | 12/2004 | Ogawa | 358/1.15 |

* cited by examiner

*Primary Examiner*—Wen-Tai Lin
(74) *Attorney, Agent, or Firm*—Frishauf, Holtz, Goodman & Chick, P.C.

(57) ABSTRACT

There is provided an address storage which stores a mail address. A destination specification acceptance section accepts specification of any of mail addresses stored in the address storage and determines a specified mail address to be a transmission destination address. An address registration section includes specified registration specification information, responds to reception of electronic mail having a body embedded with separate electronic mail, and stores, in the address storage, a sender's mail address indicated in a header of the separate electronic mail.

6 Claims, 7 Drawing Sheets

```
Received: from Osaka (unverified [xx.xx.xx.xx]) by yy.zz.domain1.co.jp
(EMWAC SMTPRS 0.83) with SMTP id<B0000139774@zz.zz.co.jp>;
Wed, 22 Aug 2001 13:42:55 +0900
Message-ID: <001e01c12ac2$3d1394c0$496410ac@host2.domain1.co.jp>
From: "Osaka_Jiro" <Osaka_Jiro@host2.domain1.co.jp>
To: "MFP1" <MFP1@mfp1.domain1.co.jp>
Subject: address registration-Patent meeting date
Date: Wed, 22 Aug 2001 13:23:47 +0900
MIME-Version: 1.0                    31
Content-Type: text/plain;
         charset="us-asscii"
Content-Transfer-Encoding: 7bit 34
----- Original Message -----
From: "Tokyo_Taro" :<Tokyo_Taro@host1.domain1.co.jp>
To: <Osaka_Jiro@host2.domain1.co.jp>
Cc: <kyoto_natsuko@host3.domain1.co.jp>
Sent: Wednesday, August 22, 2001 1:20 PM
Subject: Patent meeting date       33
                              32
>Dear all
>
>This is a mail to inform you of the next patent meeting date.
>xxxxxxxxxxxxxx
>xxxxxxxxxxxxx
>Thanks
```

FIG. 4

```
Design review-Thursday, August 23, 2001 3:25 PM
QC meeting-Friday, August 24, 2001 2:25 PM
```

FIG. 5A

```
Design review-Thursday, August 23, 2001 3:25 PM
QC meeting-Friday, August 24, 2001 2:25 PM
Patent meeting date-Wednesday, August 22, 2001 1:20 PM
```

FIG. 5B

```
xxx@yyy.domain1.co.jp
Hukushima_Yurie@host7.domain1.co.jp
Yokota_Shuji@host4.domain1.co.jp
```

FIG. 6A

```
xxx@yyy.domain1.co.jp
Hukushima_Yurie@host7.domain1.co.jp
Yokota_Shuji@host4.domain1.co.jp
Tokyo_Taro@host1.domain1.co.jp
```

FIG. 6B

```
Received: from Osaka (unverified [xx.xx.xx.xx]) by yy.zz.domain1.co.jp
(EMWAC SMTPRS 0.83) with SMTP id<B0000139774@zz.zz.co.jp>;
Wed, 22 Aug 2001 13:42:55 +0900
Message-ID: <001e01c12ac2$3d1394c0$496410ac@host2.domain1.co.jp>
From: "Osaka_Jiro" <Osaka_Jiro@host2.domain1.co.jp>
To: "MFP1" <MFP1@mfp1.domain1.co.jp>
Subject: group registration - Patent meeting date
Date: Wed, 22 Aug 2001 13:23:47 +0900          47
                                          41
MIME-Version: 1.0
Content-Type: text/plain;
        charset="us-asscii"
Content-Transfer-Encoding: 7bit 44
----- Original Message -----
From: "Tokyo_Taro" :<Tokyo_Taro@host1.domain1.co.jp>
To: <Osaka_Jiro@host2.domain1.co.jp>  ---45
Cc: <kyoto_natsuko@host3.domain1.co.jp>  ---46
Sent: Wednesday, August 22, 2001 1:20 PM
Subject: Patent meeting date            43
                                    42
>Dear all
>
>This is a mail to inform you of the next patent meeting date.
>xxxxxxxxxxxxxx
>xxxxxxxxxxxx
>Thanks
```

FIG. 7

Design review
    Chiba_Haruko@host3.domain1.co.jp
    Yokota_Shuji@host4.domain1.co.jp
    Shimizu_Shinji@host5.domain1.co.jp QC meeting
    Saitama_Akiko@host3.domain1.co.jp
    Gunma_Fuyuko@host3.domain1.co.jp

FIG. 8A

Design review
    Chiba_Haruko@host3.domain1.co.jp
    Yokota_Shuji@host4.domain1.co.jp
    Shimizu_Shinji@host5.domain1.co.jp QC meeting
    Saitama_Akiko@host3.domain1.co.jp
    Gunma_Fuyuko@host3.domain1.co.jp Patent meeting date
    Tokyo_Taro@host1.domain1.co.jp
    Osaka_Jiro@host2.domain1.co.jp
    Kyoto_natsuko@host3.domain1.co.jp

FIG. 8B

AUTOMATICALLY CREATING MAILING ADDRESS DIRECTORY IN AN IMAGE COMMUNICATION APPARATUS

BACKGROUND OF THE INVENTION

1. Field of the Invention

The present invention relates to an image communication apparatus and a control method thereof for transmitting image data to a destination address.

2. Description of the Related Art

An MFP (Multi-function peripheral) is provided with an Internet facsimile capability.

The Internet facsimile capability transmits image data attached to electronic mail via a LAN or the Internet. Accordingly, the Internet facsimile capability uses a mail address to represent the destination of an image to be transmitted. A user needs to enter the mail address for specifying the image data destination.

Generally, however, a mail address uses many characters and is complicated. Entering a mail address is very burdensome for users.

BRIEF SUMMARY OF THE INVENTION

It is an object of the present invention to save users the burden of entering a mail address.

The following image communication apparatus is provided according to an aspect of the present invention:

An image communication apparatus which transmits image data to a transmission destination address comprising: an address storage which stores a mail address; a destination specification acceptance section which accepts specification of any of mail addresses stored in the address storage and determines a specified mail address to be the transmission destination address; and an address registration section which stores, in the address storage, a sender's mail address indicated in a header of the separate electronic mail, upon receipt of electronic mail including specified registration specification information and having a body embedded with separate electronic mail.

The following image communication apparatus is provided according to another aspect of the present invention:

An image communication apparatus which transmits image data to a transmission destination address comprising: an address storage which stores a plurality of mail addresses corresponding to a group name; a destination specification acceptance section which accepts specification of a group name and determines the transmission destination address by using a plurality of mail addresses stored in the address storage corresponding to a specified group name; and an address registration section which stores, in the address storage, a plurality of specified mail addresses indicated in a header of the separate electronic mail corresponding to the determined group name, upon receipt of electronic mail having including specified registration specification information and a body embedded with separate electronic mail, determines an unused group name.

The following image communication apparatus is provided according to still another aspect of the present invention:

A control method of controlling an image communication apparatus to transmit image data to a transmission destination address and to include an address storage which stores a mail address, and a destination specification acceptance section which accepts specification of any of mail addresses stored in the address storage and determines a specified mail address to be the transmission destination address, the method comprising: storing, in the address storage, a sender's mail address indicated in a header of the separate electronic mail upon receipt of electronic mail including specified registration specification information and having a body embedded with separate electronic mail.

The following image communication apparatus is provided according to yet another aspect of the present invention:

A control method of controlling an image communication apparatus to transmit image data to a transmission destination address and to include an address storage which stores a plurality of mail addresses corresponding to a group name, and a destination specification acceptance section which accepts specification of a group name and determines the transmission destination address by using a plurality of mail addresses stored in the address storage corresponding to a specified group name, the method comprising: determining an unused group name, and storing, in the address storage, a plurality of specified mail addresses indicated in a header of the separate electronic mail corresponding to the determined group name, upon receipt of electronic mail including specified registration specification information and having a body embedded with separate electronic mail.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 shows an example of instruction mail for individual registration;

FIGS. 5A and 5B show how an individual is registered in an address book;

FIGS. 6A and 6B show how specific information is stored in a specific information area;

FIG. 7 shows an example of instruction mail for group registration; and

FIGS. 8A and 8B show how a group is registered in an address book.

DETAILED DESCRIPTION OF THE INVENTION

Figure 1:
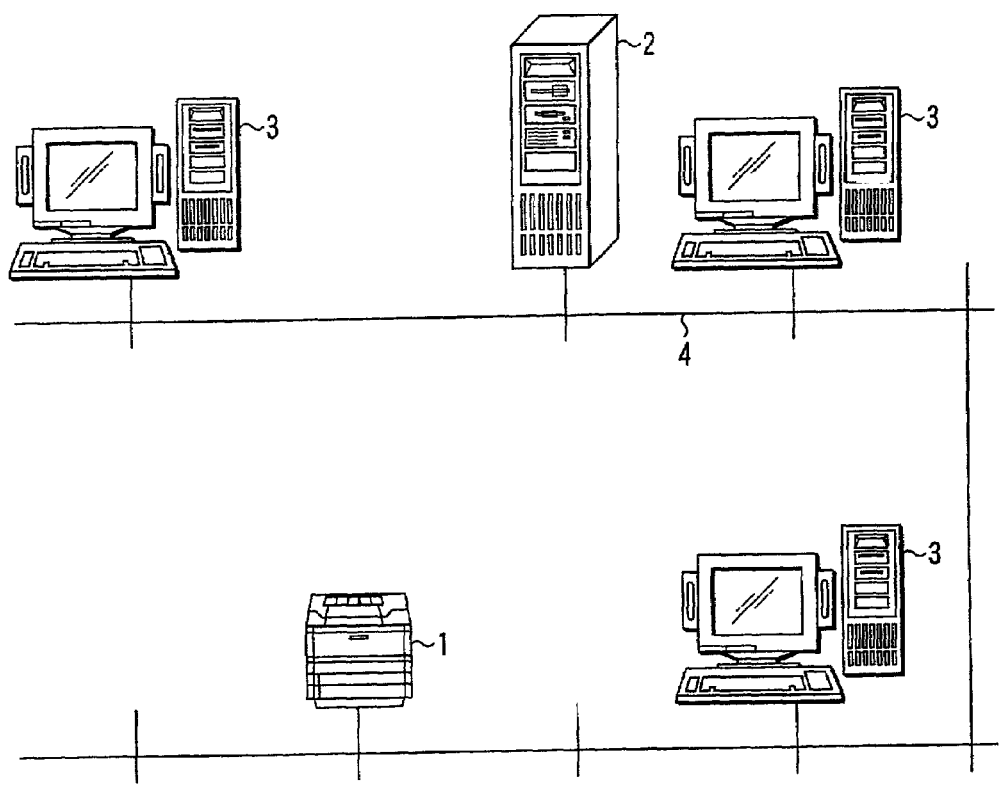
FIG. 1 shows a network system which uses an MFP according to an embodiment of the present invention.

FIG. 1 shows a network system which uses an MFP according to an embodiment of the present invention.

In FIG. 1, the reference numeral 1 denotes an MFP according to the embodiment. The MFP 1 is connected to a LAN 4. The LAN 4 connects with a plurality of computers 3 and a mail server 2. The MFP 1 and the computers 3 can exchange mail with other terminals connected to a LAN system via the mail server 2 and connected via the Internet (not shown).

Figure 2:
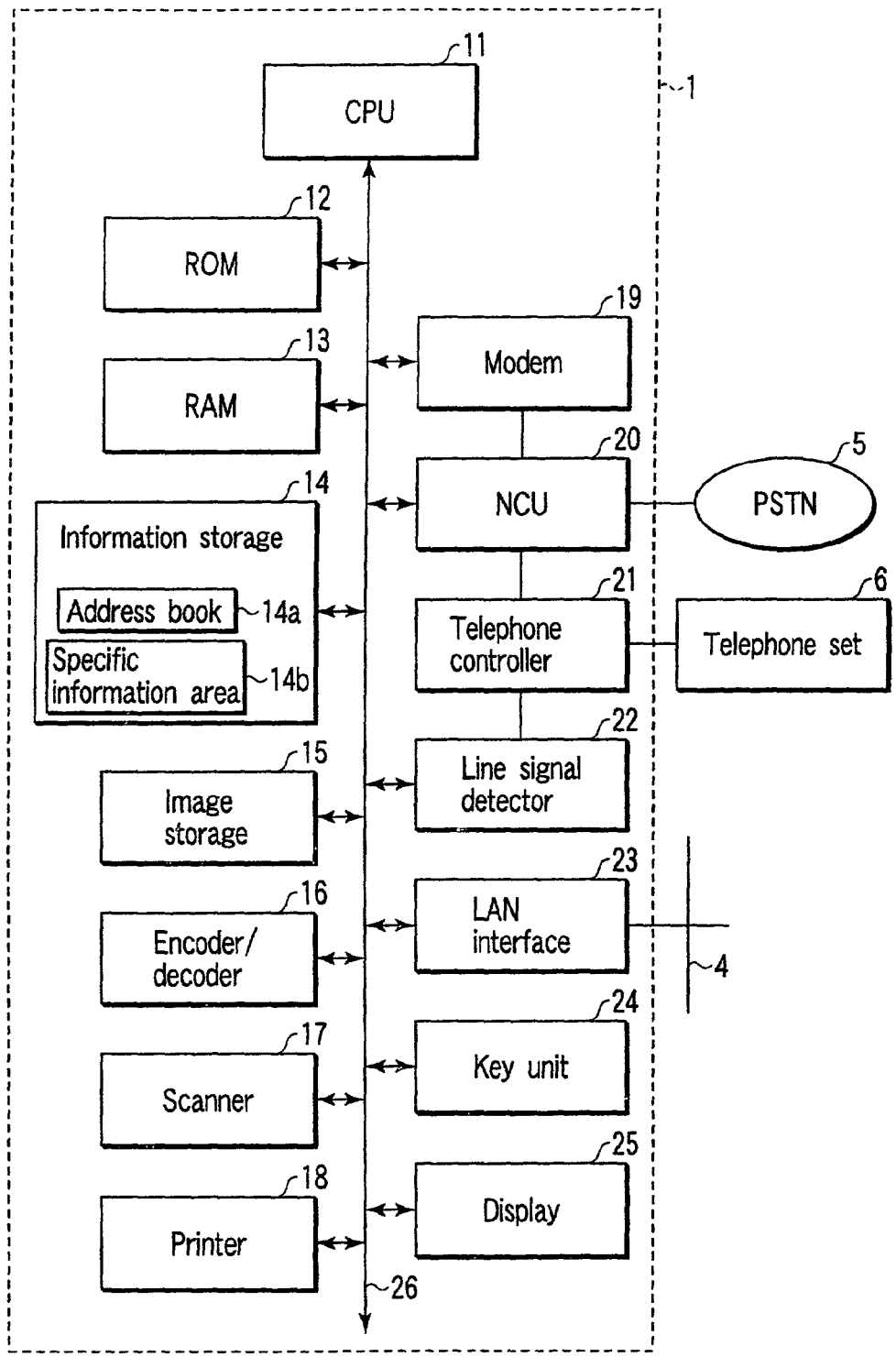
FIG. 2 is a block diagram of the MFP according to an embodiment of the present invention.

FIG. 2 is a block diagram of the MFP 1 in FIG. 1.

As shown in FIG. 1, the MFP 1 comprises a CPU 11, ROM 12, RAM 13, an information storage 14, an image storage 15, an encoder/decoder 16, a scanner 17, a printer 18, a modem 19, an NCU 20, a telephone controller 21, a line signal detector 22, a LAN interface 23, a key unit 24, and a display 25.

A bus 26 is used to interconnect the CPU 11, the ROM 12, the RAM 13, the information storage 14, the image storage 15, the encoder/decoder 16, the scanner 17, the printer 18, the modem 19, the NCU 20, the line signal detector 22, the LAN interface 23, the key unit 24, and the display 25 with each other. The NCU 20 connects with the modem 19 and the telephone controller 21. The telephone controller 21 connects with the line signal detector 22.

The CPU 11 controls each component to provide MFP operations by performing software processes based on an operation program stored in the ROM 12.

The ROM 12 stores the operation program, etc.

The RAM 13 is used as a work area or the like for storing a variety of information needed for the CPU 11 to perform diverse processes.

The information storage 14 uses flash memory, for example. The information storage 14 stores various setup information and other information. The information storage 14 contains an address book 14a and a specific information area 14b. The address book 14a stores a plurality of mail addresses. The specific information area 14b stores specific information generated when an address is automatically registered (to be described).

The image storage 15 uses a large-capacity DRAM or a hard disk unit, for example. The image storage 15 temporarily stores image data which is received and is to be transmitted.

The encoder/decoder 16 encodes image data for redundancy compression. The encoder/decoder 16 decodes image data encoded for redundancy compression.

The scanner 17 reads a transmission document and generates image data corresponding to the transmission document.

The printer 18 prints an image indicated by the image data on printing paper.

The modem 19 generates a facsimile transmission signal by modulating image data and generates a command transmission signal by modulating a command supplied from the CPU 11. The modem 19 sends the transmission signals to a PSTN subscriber line 2 via the NCU 20. The modem 19 is supplied with a facsimile transmission signal and a command transmission signal from the PSTN subscriber line 2 via the NCU 20. The modem 19 reproduces the image data by demodulating the facsimile transmission signal and the command by demodulating the command transmission signal.

The NCU 20 connects with a PSTN 3 via the PSTN subscriber line 2. The NCU 20 monitors states of the PSTN subscriber line 2, generates a call to the PSTN 3, etc. Further, the NCU 20 equalizes a fax transmission signal issued to the PSTN subscriber line 2 from the modem 19 and sets an output level of the facsimile transmission signal.

The telephone controller 21 connects with a telephone set 4 as needed. The telephone controller 21 provides known control for enabling speech communication through the use of the connected telephone set 4 via the PSTN subscriber line 2.

The line signal detector 22 is supplied with various signals from the PSTN subscriber line 2 via the NCU 20 and the telephone controller 21. The line signal detector 22 monitors the supplied signal and detects the arrival of a specified signal.

The LAN interface 23 is connected to the LAN 4. The LAN interface 23 transmits data via the LAN 4.

The key unit 24 comprises many key switches and accepts various user's instructions for the CPU 11.

The display 25 uses an LCD, for example.

The display 25 displays various information to be notified to a user under control of the CPU 11.

The CPU 11 performs software process based on an operation program stored in the ROM 12. In accordance with this process, the CPU 11 works as not only a known general control section in the MFP, but also a destination specification acceptance section, an address registration section, a received mail processing section, a deletion section, a specific information generation section, a registration inhibition section, and a specific information registration section.

When accepting the specification of a destination for image data, the destination specification acceptance section determines the transmission destination by using a mail address if this is selected from the address book 14a which stores mail addresses. Further, when accepting the specification of a destination for image data, the destination specification acceptance section determines the transmission destination by using a plurality of mail addresses corresponding to a group if this is selected from the address book 14a which stores groups. The address registration section extracts a necessary mail address from instruction mail for instructing the address registration (to be described) and registers that address in the address book 14a. The received mail processing section performs known processes such as printing, saving, etc. for electronic mail received via the LAN 4. The deletion section automatically deletes instruction mail. The specific information generation section generates specific information based on the received instruction mail. When the specific information area 14b already registers specific information generated by the specific information generation section, the registration inhibition section inhibits the address registration section from registering mail addresses. The specific information registration section registers specific information generated by the specific information generation section to the specific information area 14b as needed.

The following describes operations of the MFP configured as mentioned above. The MFP contains a plurality of types of capabilities such as copier, printer, facsimile, and scanner capabilities. Since operations for implementing these capabilities are the same as those for the conventional MFP, the description thereof is omitted. The description below chiefly covers operations about the automatic registration of mail addresses.

Suppose that a user of any computer 3 needs to register a mail address of electronic mail (hereafter referred to as separate mail) received at the computer 3 in the address book 14a of the MFP 1. In this case, the user sends electronic mail (hereafter referred to as instruction mail) containing the separate mail in its body to the MFP 1. The instruction mail's subject is configured to be a character string comprising a specified first or second instruction character string followed by a dash "-", then by the separate mail's subject. The first instruction character string specifies registration (hereafter referred to as the individual registration) of only a mail address indicated in the From field of the separate mail. The second instruction character string specifies registration (hereafter referred to as the group registration) of all mail addresses indicated in the separate mail header. In the embodiment, the first instruction character string is represented as "address registration". The second instruction character string is represented as "group registration".

Figure 3:
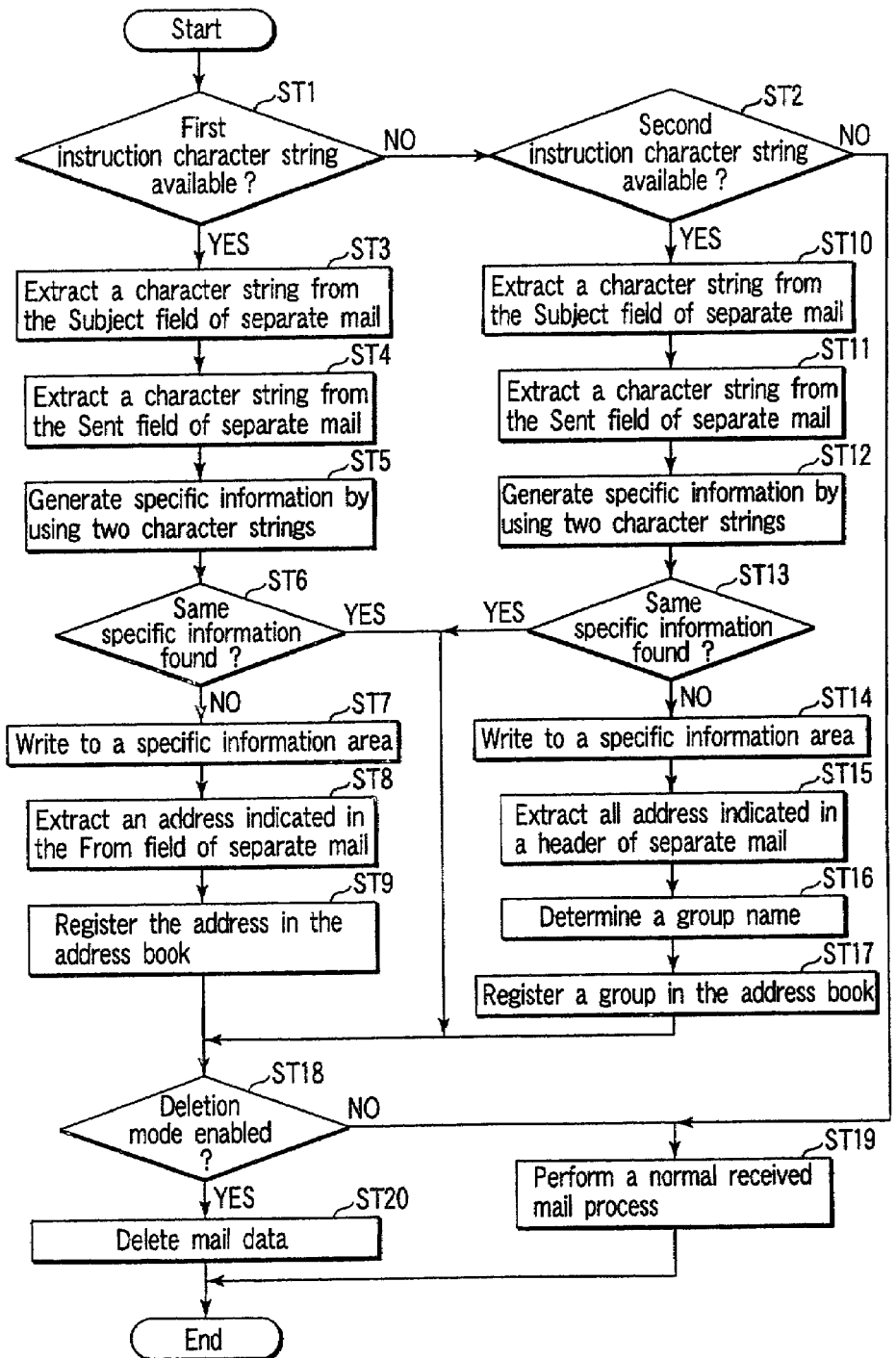
FIG. 3 is a flowchart showing processing of a CPU in FIG. 2.

The CPU 11 receives the electronic mail according to known processing and performs a process as shown in FIG. 3.

In steps ST1 and ST2, the CPU 11 checks if the Subject field of the received electronic mail contains the first or second instruction character string.

FIG. 4 shows an example of instruction mail for instructing the individual registration.

In FIG. 4, an instruction mail header is lines of text up to the first blank line. The header contains the From field indicating "Osaka_Jiro@host2.domain1.co.jp". This is a mail address of the sender who transmitted the instruction mail. The To field indicates "MFP1@mfp1.domain1.co.jp". This is a mail address of the instruction mail destination and is allocated to the MFP 1. The Subject field indicates "address registration-Patent meeting date". This is a subject of the mail. Since the instruction mail specifies the individual registration, the subject contains a character string 31 representing "address registration".

In FIG. 4, the instruction mail body is shown below the first blank line. The separate mail is inserted here. In FIG. 4, a separate mail header is provided between the first and second blank lines. The header shows management information about the separate mail transmission. In FIG. 4, the separate mail body is shown below the second blank line.

In step ST1, the CPU 11 confirms that the Subject field contains the first instruction character string. Then, in step ST3, the CPU 11 extracts a character string 32 from the separate mail inserted into the electronic mail. In step ST4, the CPU 11 extracts a character string 33 from the Sent field in the separate mail. In step ST5, the CPU 11 generates specific information by concatenating the character string extracted in step ST3, followed by a dash "-", then by the character string extracted in step ST4. From the instruction mail as shown in FIG. 4, for example, the CPU 11 generates specific information "Patent meeting date-Wednesday, August 22, 2001 1:20 PM".

In step ST6, the CPU 11 checks whether or not the specific information area 14b already stores specific information generated in step ST5. When the information already stored in the specific information area 14b matches information as shown in FIG. 5A, the CPU 11 confirms in step ST6 that the specific information generated in step ST5 is not stored in the specific information area 14b. In this case, the CPU 11 writes the specific information generated in step ST5 to the specific information area 14b. When the information stored in the specific information area 14b matches information as shown in FIG. 5A, the information is updated to information as shown in FIG. 5B.

In step ST8, the CPU 11 extracts an address 34 from the From field in the separate mail. When the instruction mail is as shown in FIG. 4, the CPU 11 extracts "Tokyo_Taro@host1.domain1.co.jp" in step ST8. In step ST9, the CPU 11 registers the extracted mail address in the address book 14a. As a result, when the individual registration information already stored in the address book 14a matches information as shown in FIG. 6A, the information is updated to information as shown in FIG. 6B.

FIG. 7 exemplifies instruction mail for specifying the group registration.

As shown in FIG. 7, the instruction mail has a format similar to that of the instruction mail as shown in FIG. 4.

Since the instruction mail specifies the group registration, the Subject field contains a character string 41 "group registration".

In step ST2, the CPU 11 confirms that the Subject field contains the second instruction character string. Then, in step ST10, the CPU 11 extracts a character string 42 from the Subject field of the separate mail inserted into the electronic mail. In step ST11, the CPU 11 extracts a character string 43 from the Sent field of the separate mail. In step ST12, the CPU 11 generates specific information by concatenating the character string extracted in step ST10, followed by a dash "-", then by the character string extracted in step ST11. From the instruction mail as shown in FIG. 7, for example, the CPU 11 generates specific information "Patent meeting date-Wednesday, August 22, 2001 1:20 PM".

In step ST13, the CPU 11 checks whether or not the specific information area 14b already stores specific information generated in step ST12. The specific information area 14b separately stores specific information about the individual registration and specific information about the group registration. Accordingly, the CPU 11 checks in step ST13 whether or not the specific information generated in step ST12 is contained in the specific information about the group registration stored in the specific information area 14b.

When confirming that the specific information area 14B does not store the specific information generated in step ST5, the CPU 11, in step ST14, writes the specific information generated in step ST5 to the specific information area 14b.

In step ST15, the CPU 11 extracts all addresses indicated in the header of the separate mail. When the instruction mail is as shown in FIG. 7, the CPU 11, in step ST15, extracts an address 44 "Tokyo_Taro@host1.domain1.co.jp" from the From field, an address 45 "Osaka_Jiro@host2.domain1.co.jp" from the To field, and an address 46 "Kyoto_natsuko@host3.domain1.co.jp" from the Cc field.

In step ST16, the CPU 11 determines a group name so that it does not duplicate a group name already registered in the address book 14a. In this embodiment, the CPU 11 determines a group name candidate by excluding the second instruction character string and a separator character for the second instruction character string from character strings in the Subject field of the instruction mail. When the candidate is already registered in the address book 14a, the CPU 11 determines a group name, e.g., by suffixing a number to the candidate. When the instruction mail is as shown in FIG. 7, the CPU 11 determines a character string 47 "Patent meeting date" to be the group name candidate by excluding "Patent meeting date-" from the character string "group address registration-Patent meeting date". If the group name "Patent meeting date" is not registered in the address book 14a, the CPU 11 determines it to be the group name. If the group name "Patent meeting date" is registered in the address book 14a, however, the CPU 11 determines, e.g., "Patent meeting date2" to be the group name.

In step ST17, the CPU 11 registers the address extracted in step ST15 in the address book 14a corresponding to the group name determined in step ST16. Consequently, when the group registration information already stored in the address book 14a is as shown in FIG. 8A, it is updated to information as shown in FIG. 8B.

After registering the address in the address book in step ST9 or ST17, the CPU 11 moves the process to step ST18. When confirming in step ST6 that the specific information area 14b already stores the specific information generated in step ST5, the CPU 11 moves the process to step ST18 without performing processes in steps ST7 through ST9. When confirming in step ST13 that the specific information area 14b already stores the specific information generated in step ST12, the CPU 11 moves the process to step ST18 without performing processes in steps ST14 through ST17. Namely, when the specific information area 14b already stores the specific information generated based on the instruction mail, the CPU 11 does not register a mail address based on the instruction mail.

In step ST18, the CPU 11 confirms whether or not the deletion mode is enabled. A user can enable or disable the deletion mode as needed. On confirming that the deletion mode is not enabled, the CPU 11, in step ST19, performs a normal received mail process with respect to the instruction mail. The normal received mail process means, e.g., analyzing the electronic mail content and saving, displaying, or printing it appropriately according to the analysis result. After completing this normal received mail process, the CPU 11 terminates the process for the current received electronic mail.

In contrat, on confirming that the deletion mode is enabled, the CPU 11, in step ST20, deletes data for the current received electronic mail. Upon completion of the deletion, the CUP 11 terminates the process for the current received electronic mail.

There may be a case where the CPU 11 confirms in steps ST1 and ST2 that the Subject field of the current received electronic mail contains neither the first instruction character string nor the second instruction character string. In this case, the CPU 11 moves the process to step ST19 to perform the normal received mail process. After completing the normal received mail process, the CPU 11 terminates the process for the current received electronic mail. Namely, when the current received electronic mail is not the instruction mail, the CPU 11 performs the conventional process only.

The mail address registered in the address book 14a can be used for specifying the destination of an image transmitted from the MFP 1. Namely, when a user specifies the destination by specifying a mail address individually registered in the address book 14a, the CPU 11 determines the mail address as the destination. When a user specifies the destination by specifying a group name registered in the address book 14a, the CPU 11 determines all mail addresses registered correspondingly to the group name as the destination.

According to the embodiment as mentioned above, electronic mail received at the computer 3 is transferred to the MFP 1 from the computer 3. By doing this, it is possible to register a mail address indicated in the electronic mail in the address book 14a of the MFP 1. Accordingly, a user of the computer 3 can very conveniently register a mail address indicated in the electronic mail received at the computer 3, without needing to enter a mail address by operating the MFP 1.

When the group registration is specified according to the embodiment, a plurality of mail addresses indicated in one electronic mail is registered corresponding to one group name. When the group name is specified during destination specification, all mail addresses registered corresponding to the group name are determined to be destinations. Accordingly, when a user receives electronic mail for sending the minutes of a meeting, etc., to a plurality of mail addresses, he or she can easily register a sender of the minutes and a plurality of destinations as one group. Further, specifying the group name makes it possible to easily specify the destination of an image to be transmitted to each mail address in the registered group.

When the Subject field contains the first instruction character string such as "address registration" or the second instruction character string such as "group registration", the embodiment identifies the mail to be instruction mail and registers an address. Accordingly, a user can allow the MFP 1 to register an address just by adding a simple character string to the Subject field, reducing workload. Further, the computer 3 need not be provided with a special capability for creating instruction mail and is usable as is.

When the deletion mode is enabled, the embodiment does not perform the normal received mail process for the instruction mail. When the address registration terminates based on the instruction mail, the instruction mail is deleted. Generally, the instruction mail becomes unnecessary once the address registration terminates. Saving or printing the unnecessary instruction mail is a waste of memory resources or paper. The embodiment can prevent this.

The embodiment can disable the deletion mode, allowing the MFP 1 to save or print the instruction mail. In this manner, an administrator of the MFP 1 can manage arrival situations of instruction mails.

The embodiment creates specific information by combining a character string in the Subject field and a character string in the Sent field of the separate mail. A mail address is registered only when the specific information is not stored in the specific information area 14*b*. When a mail address is registered, the specific information is written to the specific information area 14*b*. There may arrive a plurality of instruction mails in which the same electronic mail is inserted as separate mail. Even in this case, a mail address is registered only based on the first arrived instruction mail. This can prevent a mail address from being registered redundantly. It is possible to effectively use a storage area available for the address book 14*a* and register many mail addresses.

The present invention is not limited to the aforementioned embodiment.

The registration instruction information is not limited to a character string such as "address registration" or "group registration", but may be any character string. The registration instruction information may be a control code, not a character string. The position for adding the registration instruction information is not limited to the Subject field.

The mail address for the group registration is not limited to all mail data indicated in the separate mail header. For example, it may be preferable to apply the group registration to addresses except a mail address indicated in the To field of the separate mail header. It is also possible to register mail addresses indicated in the separate mail body.

The present invention is applicable not only to an MFP, but also to other forms of apparatuses such as a facsimile machine, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image communication apparatus which transmits image data to a transmission destination address, said apparatus comprising:
    an address storage which stores at least one mail address;
    a destination specification acceptance section which accepts a specification of any said stored mail address and determines the specified mail address to be the transmission destination address;
    an address registration section which, upon receipt of electronic mail including specified registration specification information and a body embedded with separate electronic mail, stores in the address storage a mail address of a sender indicated in a header of the separate electronic mail;
    a specific information storage which stores specific information;
    a specific information generation section which generates the specific information based on specified information included in the separate electronic mail, upon receipt of the electronic mail including the specified registration specification information and the body embedded with the separate electronic mail;
    a registration inhibition section which inhibits the address registration section from storing the mail address in the address storage when the specific information storage already contains the specific information generated by the specific information generation section; and
    a specific information registration section which stores the specific information generated by the specific information generation section in the specific information storage only when the specific information storage does not already contain the generated specific information;
    wherein the specific information generation section generates the specific information by combining a character string included in a subject of the separate electronic mail with a character string indicating a time of creating the separate electronic mail and wherein the registration specification information corresponds to a specified character string included in a subject of the electronic mail.

2. The image communication apparatus according to claim 1, further comprising:
    a received mail processing section which, when electronic mail is received, performs a specified process for the electronic mail; and
    a deletion section which deletes electronic mail containing the registration specification information without allowing the received mail processing section to perform the specified process.

3. An image communication apparatus which transmits image data to a transmission destination address, said apparatus comprising:
    an address storage which stores at least one group name and a plurality of mail addresses corresponding to each said group name;
    a destination specification acceptance section which accepts specification of any said stored group name and determines the transmission destination address based on the plurality of mail addresses stored in the address storage in correspondence with the specified group name; and
    an address registration section which, upon receipt of electronic mail including specified registration specification information and a body embedded with separate electronic mail, determines an unused group name and stores, in the address storage in correspondence with the determined group name, a plurality of specified mail addresses indicated in a header of the separate electronic mail;
    a specific information storage which stores specific information;
    a specific information generation section which generates the specific information based on specified information included in the separate electronic mail, upon receipt of the electronic mail including the specified registration specification information and the body embedded with the separate electronic mail;
    a registration inhibition section which inhibits the address registration section from storing the mail address in the address storage when the specific information storage already contains the specific information generated by the specific information generation section; and a specific information registration section which stores the specific information generated by the specific information generation section in the specific information storage only when the specific information storage does not already contain the generated specific information;

wherein the specific information generation section generates the specific information by combining a specified character string included in a subject of the separate electronic mail with a character string indicating a time of creating the separate electronic mail and wherein the registration specification information corresponds to a specified character string included in a subject of the electronic mail.

4. The image communication apparatus according to claim 3, wherein the address registration section determines the group name to include at least part of a character string indicating a subject of the electronic mail.

5. The image communication apparatus according to claim 3, wherein the address registration section stores, in the address storage, all mail addresses indicated in the header of the separate electronic mail.

6. The image communication apparatus according to claim 3, further comprising:

a received mail, processing section which, when electronic mail is received, performs a specified process concerning the electronic mail; and a deletion section which deletes electronic mail containing the registration specification information without allowing the received mail processing section to perform the specified process.

* * * * *